US011752881B2

(12) United States Patent
Otanez et al.

(10) Patent No.: US 11,752,881 B2
(45) Date of Patent: Sep. 12, 2023

(54) INTELLIGENT VEHICLES AND CONTROL LOGIC FOR BRAKE TORQUE REQUEST ESTIMATION FOR COOPERATIVE BRAKE SYSTEM CONTROL

(71) Applicant: GM GLOBAL TECHNOLOGY OPERATIONS LLC, Detroit, MI (US)

(72) Inventors: Paul G. Otanez, Franklin, MI (US); Yiran Hu, Shelby Township, MI (US); Nathaniel S. Michaluk, Howell, MI (US); Krunal P. Patel, South Lyon, MI (US); Adam J. Heisel, South Lyon, MI (US); Kevin J. Storch, Brighton, MI (US); Jacob M. Knueven, Southfield, MI (US); Matthew Yard, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 390 days.

(21) Appl. No.: 17/153,244

(22) Filed: Jan. 20, 2021

(65) Prior Publication Data
US 2022/0227237 A1 Jul. 21, 2022

(51) Int. Cl.
*B60L 15/20* (2006.01)
*B60T 8/17* (2006.01)
(Continued)

(52) U.S. Cl.
CPC ........ *B60L 15/2009* (2013.01); *B60T 8/1701* (2013.01); *B60W 10/18* (2013.01); *B60W 10/184* (2013.01); *B60W 30/09* (2013.01)

(58) Field of Classification Search
CPC ........... B60L 15/2009; B60L 2240/423; B60L 2240/70; B60L 2250/26; B60L 7/22;
(Continued)

(56) References Cited

U.S. PATENT DOCUMENTS 6,356,838 B1 3/2002 Paul
6,697,730 B2 2/2004 Dickerson
(Continued)

FOREIGN PATENT DOCUMENTS

DE 102014016567 A1 5/2016
EP 2610836 A1 7/2013

OTHER PUBLICATIONS

Moayyedi, Alireza. Analysis and Comparison of One-Pedal Driving Strategies for Electric Vehicles from Consumption and Comfort Point of View. Diss. Politecnico di Torino, 2020. (Year: 2020).*

(Continued)

*Primary Examiner* — Russell Frejd
*Assistant Examiner* — Ana D Thomas
(74) *Attorney, Agent, or Firm* — Quinn IP Law

(57) ABSTRACT

A method of operating a vehicle includes a vehicle controller receiving an operator-input vehicle control command with an associated torque request, and identifying any propulsion actuator constraints that limit a brake torque capacity available from the vehicle powertrain. Using the propulsion actuator constraint(s) and torque request, the controller determines a propulsion brake torque distribution for the vehicle's road wheels and a maximum brake torque capacity for the powertrain actuator(s). A first brake torque request is determined using the propulsion brake torque distribution and a vehicle control mode of the powertrain system, and a second brake torque request is determined using the maximum brake torque capacity and the vehicle control mode. A friction brake torque command is determined by arbitrating between the first and second brake torque requests. The vehicle controller transmits the friction brake torque command to the friction brake system and a powertrain brake command to the powertrain actuator(s).

20 Claims, 3 Drawing Sheets

(51) Int. Cl.
   *B60W 10/18* (2012.01)
   *B60W 10/184* (2012.01)
   *B60W 30/09* (2012.01)
(58) Field of Classification Search
   CPC . B60L 7/18; B60L 7/26; B60T 8/1701; B60T 2270/604; B60T 8/17; B60T 2260/09; B60W 10/18; B60W 10/184; B60W 30/09; B60W 30/18127
   See application file for complete search history.

(56) References Cited

U.S. PATENT DOCUMENTS

| | | |
|---|---|---|
| 7,266,438 B2 | 9/2007 | Kellum et al. |
| 7,589,643 B2 | 9/2009 | Dagci et al. |
| 7,739,036 B2 | 6/2010 | Grimm et al. |
| 7,840,427 B2 | 11/2010 | O'Sullivan |
| 8,050,855 B2 | 11/2011 | Coy et al. |
| 8,170,739 B2 | 5/2012 | Lee |
| 8,384,532 B2 | 2/2013 | Szczerba et al. |
| 8,428,843 B2 | 4/2013 | Lee et al. |
| 8,605,011 B2 | 12/2013 | Seder et al. |
| 8,612,139 B2 | 12/2013 | Wang et al. |
| 8,633,979 B2 | 1/2014 | Szczerba et al. |
| 8,692,739 B2 | 4/2014 | Mathieu et al. |
| 8,818,708 B2 | 8/2014 | Mathieu et al. |
| 8,849,515 B2 | 9/2014 | Moshchuk et al. |
| 8,996,273 B2 | 3/2015 | Lee et al. |
| 9,014,915 B2 | 4/2015 | Chatterjee et al. |
| 9,099,006 B2 | 8/2015 | Mudalige et al. |
| 9,229,453 B1 | 1/2016 | Lee |
| 9,238,412 B2 | 1/2016 | Kidston et al. |
| 9,267,810 B2 | 2/2016 | Pritchard |
| 9,283,967 B2 | 3/2016 | Lee |
| 9,443,429 B2 | 9/2016 | Mathieu et al. |
| 9,487,212 B1 | 11/2016 | Adam et al. |
| 9,809,130 B2 | 11/2017 | Heisel et al. |
| 9,868,443 B2 | 1/2018 | Zeng et al. |
| 9,931,963 B2 | 4/2018 | Heisei et al. |
| 10,005,363 B1 | 6/2018 | Correia et al. |
| 10,227,021 B2 | 3/2019 | Lor et al. |
| 10,259,341 B2 | 4/2019 | Lor et al. |
| 10,556,587 B2 | 2/2020 | Michaluk |
| 2009/0030885 A1 | 1/2009 | DePasquale et al. |
| 2010/0228415 A1 | 9/2010 | Paul |
| 2011/0059693 A1 | 3/2011 | O'Sullivan |
| 2011/0313880 A1 | 12/2011 | Paul et al. |
| 2012/0101713 A1 | 4/2012 | Moshchuk et al. |
| 2012/0239452 A1 | 9/2012 | Trivedi et al. |
| 2013/0032421 A1 | 2/2013 | Bonne et al. |
| 2013/0035821 A1 | 2/2013 | Bonne et al. |
| 2013/0054128 A1 | 2/2013 | Moshchuk et al. |
| 2013/0204676 A1 | 8/2013 | Hindi et al. |
| 2013/0219294 A1 | 8/2013 | Goldman-Shenhar et al. |
| 2014/0011522 A1 | 1/2014 | Lin et al. |
| 2015/0077270 A1 | 3/2015 | Rubin et al. |
| 2015/0266383 A1* | 9/2015 | Kidston ............... B60L 58/12 701/70 |
| 2015/0353082 A1 | 12/2015 | Lee et al. |
| 2015/0353085 A1 | 12/2015 | Lee |
| 2016/0102986 A1 | 4/2016 | Ma et al. |
| 2016/0231124 A1 | 8/2016 | Nickolaou et al. |
| 2016/0260328 A1 | 9/2016 | Mishra et al. |
| 2016/0320194 A1 | 11/2016 | Liu et al. |
| 2016/0320195 A1 | 11/2016 | Liu et al. |
| 2016/0320198 A1 | 11/2016 | Liu et al. |
| 2016/0321566 A1 | 11/2016 | Liu et al. |
| 2016/0321771 A1 | 11/2016 | Liu et al. |
| 2017/0021830 A1 | 1/2017 | Feldman et al. |
| 2017/0136916 A1 | 5/2017 | Heisel et al. |
| 2017/0316684 A1 | 11/2017 | Jammoussi et al. |
| 2018/0093572 A1* | 4/2018 | Hall ....................... B60T 8/245 |
| 2018/0257660 A1 | 9/2018 | Ibrahim et al. |
| 2018/0364700 A1 | 12/2018 | Liu et al. |
| 2018/0374341 A1 | 12/2018 | Branson et al. |
| 2019/0369626 A1 | 12/2019 | Lui et al. |
| 2019/0378412 A1 | 12/2019 | Zhu |

OTHER PUBLICATIONS

Moayyedi, Alireza. Analysis and Comparison of One-Pedal Driving Strategies for Electric Vehicles from Consumption and Comfort Point of View. Diss. Politecnico di Torino, 2020. (Year: 2010).*

Li, Wei, Xiaoyuan Zhu, and Ji Ju. "Hierarchical braking torque control of in-wheel-motor-driven electric vehicles over CAN." IEEE Access 6 (2018): 65189-65198. (Year: 2018).*

Min, Kyunghan, et al. "Vehicle deceleration prediction model to reflect individual driver characteristics by online parameter learning for autonomous regenerative braking of electric vehicles." Sensors 19.19 (2019): 4171. (Year: 2019).*

Sim, Gyubin, et al. "Deceleration Planning Algorithm Based on Classified Multi-Layer Perceptron Models for Smart Regenerative Braking of EV in Diverse Deceleration Conditions." Sensors 19.18 (2019): 4020. (Year: 2019).*

* cited by examiner

INTELLIGENT VEHICLES AND CONTROL LOGIC FOR BRAKE TORQUE REQUEST ESTIMATION FOR COOPERATIVE BRAKE SYSTEM CONTROL

INTRODUCTION

The present disclosure relates generally to powertrain and brake systems for motor vehicles. More specifically, aspects of this disclosure relate to cooperative friction brake and propulsion system braking for one-pedal driving operations of motor vehicles.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, road wheels, etc.). Automobiles have historically been powered by a reciprocating-piston type internal combustion engine (ICE) assembly due to its ready availability and relatively inexpensive cost, light weight, and overall efficiency. Such engines include compression-ignited (CI) diesel engines, spark-ignited (SI) gasoline engines, two, four, and six-stroke architectures, and rotary engines, as some non-limiting examples. Hybrid electric and full electric vehicles (collectively "electric-drive vehicles"), on the other hand, utilize alternative power sources to propel the vehicle and, thus, minimize or eliminate reliance on a fossil-fuel based engine for tractive power.

A full electric vehicle (FEV)—colloquially labeled an "electric car"—is a type of electric-drive vehicle configuration that altogether omits the internal combustion engine and attendant peripheral components from the powertrain system, relying on a rechargeable energy storage system (RESS) and a traction motor for vehicle propulsion. The engine assembly, fuel supply system, and exhaust system of an ICE-based vehicle are replaced with a single or multiple traction motors, a traction battery pack, and battery cooling and charging hardware in a battery-based FEV. Hybrid electric vehicle (HEV) powertrains, in contrast, employ multiple sources of tractive power to propel the vehicle, most commonly operating an internal combustion engine assembly in conjunction with a battery-powered or fuel-cell-powered traction motor. Since hybrid-type, electric-drive vehicles are able to derive their power from sources other than the engine, HEV engines may be turned off, in whole or in part, while the vehicle is propelled by the electric motor(s).

Hybrid-electric and full-electric vehicle applications may employ an electronic vehicle motion controller (VMC) to interpret an operator's accelerator pedal position in order to derive a desired axle torque. The VMC may then arbitrate the operator's desired axle torque against advanced driver assistance system (ADAS) torque requests and vehicle-automated "intervention" torque requests, such as vehicle overspeed protection, traction or stability control, adaptive cruise control (ACC), etc. A final arbitrated axle torque request is then sent by the VMC to a powertrain control module (PCM) or a brake control module (BCM) to assess how to use a combination of actuators, such as the engine, traction motor(s), transmission, friction brakes, etc., to achieve a final desired axle torque. When the vehicle is moving in a forward direction of travel and the driver removes his/her foot from the accelerator pedal (a "tip-out" maneuver), the VMC may automatically command a negative axle torque to decelerate the vehicle. For electric-drive vehicles, a desired negative axle torque may be delivered by a "cooperative brake system" through combined application of negative motor torque and engagement of the vehicle's friction brake system.

SUMMARY

Presented herein are closed-loop feedback control systems with attendant control logic for optimized vehicle brake torque estimation, methods for making and methods for operating such systems, and intelligent electric-drive vehicles with cooperative friction brake and propulsion actuator braking systems for one-pedal driving (OPD). By way of example, controller architectures and methods are presented for calculating brake torque request values and, based on these calculated values, coordinating one or more propulsion actuators with one or more friction brake actuators of a vehicle's cooperative brake system to achieve a desired final brake torque request value. To derive the final brake torque request, the system may manage shaping of an operator's torque request using transient acceleration response data to account for both real-time friction brake torque requests and real-time propulsion component torque requests. The control scheme may also calculate friction brake torque requests to avoid filling for VMC torque cuts or, alternatively, to include filling for VMC torque cuts. Friction brake torque values may be calculated by determining a road-load compensated driver torque request when the VMC is in a speed control mode.

Attendant benefits for at least some of the disclosed concepts include an intelligent OPD-enabled vehicle with improved friction brake torque estimation for optimized cooperative brake system control. In the case of motor braking during a regenerative braking (regen) operation in an HEV or FEV, predefined battery conditions, such as a high state of charge (SOC), may prevent the motor(s) alone from providing the requisite braking torque. Disclosed control schemes complement a powertrain system braking actuator with a friction brake system braking actuator in order to deliver a final desired deceleration torque when the powertrain actuator(s) alone cannot meet the demand. In addition to the foregoing advantages, disclosed features may also help to reduce system complexity and calibration time, improve powertrain response time, enhance vehicle driveability, and optimize tip-in and tip-out driving maneuvers.

Aspects of this disclosure are directed to system control logic, closed-loop feedback control techniques, and computer-readable media (CRM) for optimized vehicle brake torque estimation for cooperative brake systems. In an example, a method is presented for operating a motor vehicle, including ICE, HEV and FEV-powertrain configurations. This representative method includes, in any order and in any combination with any of the above and below disclosed options and features: receiving, via a resident or remote vehicle controller from a driver, occupant, or vehicle subsystem (collectively "operator") via an electronic input device (e.g., accelerator pedal, brake pedal, telematics unit, communications bus, etc.), a vehicle control command with an associated torque request for maneuvering the motor vehicle; determining, via the vehicle controller, a propulsion actuator constraint (e.g., battery power constraint, axle torque constraint, vehicle motion controller (VMC) compensation constraint, etc.) that limits a brake torque capacity available from one or more powertrain actuators of the vehicle's powertrain system; and determining, via the vehicle controller based on at least the propulsion actuator constraint and the torque request input by the operator, a propulsion brake torque distribution for the road wheels of the motor vehicle (e.g., distribution across axles 1, 2, . . . n) and a maximum effective brake torque capacity available from the powertrain actuator(s).

Continuing with the discussion of the foregoing example, the method also includes: responsive to a negative brake torque request, determining a first friction brake torque request based, at least in part, on the propulsion brake torque distribution, the torque request input by the operator, and a vehicle control mode of the powertrain system (e.g., speed control mode or torque control mode); responsive to the negative brake torque request, determining a second friction brake torque request based, at least in part, on the maximum brake torque capacity, the torque request input by the operator, and the vehicle control mode; determining a final friction brake torque command by arbitrating between the two friction brake torque requests based on a brake torque optimization decision; and the vehicle controller transmitting the final friction brake torque command to the friction brake system (e.g., from the VMC to an electronic brake control module (EBCM)) and a final powertrain brake command to the powertrain actuator (e.g., from the VMC to a dedicated PIM submodule for a traction motor or an electric drive unit).

Additional aspects of this disclosure are directed to closed-loop feedback control systems and intelligent motor vehicles with optimized friction brake torque estimation for a cooperative brake system, e.g., to execute a one-pedal driving operation. As used herein, the terms "vehicle" and "motor vehicle" may be used interchangeably and synonymously to include any relevant vehicle platform, such as passenger vehicles (ICE, HEV, FEV, fuel cell, fully and partially autonomous, etc.), commercial vehicles, industrial vehicles, tracked vehicles, off-road and all-terrain vehicles (ATV), motorcycles, farm equipment, watercraft, aircraft, etc. In an example, a motor vehicle includes a vehicle body with a passenger compartment, multiple road wheels mounted to the vehicle body, and other standard original equipment. For electric-drive vehicle applications, one or more electric traction motors operate alone (e.g., for FEV powertrains) or in conjunction with an internal combustion engine assembly (e.g., for HEV powertrains) to selectively drive one or more of the road wheels to thereby propel the vehicle. A friction brake system is operable to selectively slow or stop the electric-drive vehicle. An electronic input device, which may be in the nature of a lone accelerator pedal, both an accelerator pedal and a brake pedal, a joystick controller, or similarly suitable input device, is operable to receive vehicle control inputs from a vehicle operator.

Continuing with the discussion of the above example, the vehicle also includes an onboard or off-board vehicle controller that is programmed to receive one or more vehicle control commands with associated torque requests for the motor vehicle and identify any propulsion actuator constraints that limit the brake torque capacity available from one or more powertrain actuators of the powertrain system. Using the propulsion actuator constraint and torque request, the vehicle controller determines a propulsion brake torque distribution for the vehicle road wheels and a maximum brake torque capacity for the powertrain actuator(s). A first friction brake torque request is calculated using the propulsion brake torque distribution, the torque request, and a vehicle control mode of the powertrain system. Likewise, a second friction brake torque request is calculated using the maximum brake torque capacity, torque request, and vehicle control mode. A final friction brake torque command is derived by arbitrating between the first and second friction brake torque requests based on a brake torque optimization decision. Based on this determination, the final friction brake torque command is transmitted to the friction brake system and a powertrain brake command is transmitted to the powertrain actuator(s).

For any of the disclosed systems, methods, and vehicles, a road load correction may be determined based on a road gradient and/or speed profile of the motor vehicle. If the vehicle control mode is set as a speed control mode, the vehicle controller may responsively calculate a compensated torque request as a sum of the torque request and the road load correction. In this instance, the compensated torque request is used to determine the friction brake torque request values when the vehicle control mode is set as the speed control mode. However, if the vehicle control mode is set to another control mode, an uncompensated torque request is used to determine the friction brake torque request values. For example, determining the first friction brake torque request may include calculating the difference between: (1) the torque request or the compensated torque request, and (2) a sum of individual torque requests included in the propulsion brake torque distribution for the road wheels of the motor vehicle. Moreover, determining the second friction brake torque request may include calculating the difference between: (1) the torque request or the compensated torque request, and (2) the maximum brake torque capacity of the powertrain actuator determined from the propulsion actuator constraint.

For any of the disclosed systems, methods, and vehicles, arbitrating between the friction brake torque request values may include, responsive to the maximum brake torque capacity for the powertrain actuator being insufficient to achieve the operator's torque request, blending the two friction brake torque requests while emphasizing or including a larger percentage of ("blending towards") the first friction brake torque request. If, however, estimated or sensed vehicle dynamics data indicates that the propulsion brake torque distribution is insufficient to achieve the operator's torque request, arbitrating between the friction brake torque request values may include blending the friction brake torque requests with a larger percentage of the second friction brake torque request. As a further option, the vehicle controller may receive sensor signals from a speed sensor indicative of a real-time vehicle speed of the motor vehicle, and select the vehicle control mode as a speed control mode or a torque control mode using the real-time vehicle speed. Vehicle control mode may also be determined from pedal position and/or road grade data.

For any of the disclosed systems, methods, and vehicles, the controller may receive an OPD level-selection input signal, a brake pedal position input signal, a regen on demand (ROD) input signal, and/or a park-rear-neutral-drive-low (PRNDL) input signal and, based one or more of these signals, determine the torque request associated with the vehicle control command input by the operator. The operator-input torque request may also be based on a prior final friction brake torque command that was already transmitted to the friction brake system. As yet a further option, the vehicle controller may employ memory-stored acceleration response data to determine a negative torque command for the torque request associated with the vehicle control command; this negative torque command is then shaped based on memory-stored transient acceleration response data.

For any of the disclosed systems, methods, and vehicles, the vehicle controller may take on numerous alternative control unit and networked controller architectures, including a vehicle motion controller and a driver command interpreter (DCI) module contained within a traction power inverter control module (TPIM). The VMC may transmit the powertrain brake command to one or more control modules operable to govern the powertrain actuator(s). In this instance, the friction brake system may include an electronic brake control module; the VMC transmits the friction brake torque command to the EBCM. For some vehicle applications, the motor vehicle includes a battery pack, the powertrain actuator includes an electric traction motor, and the propulsion actuator constraint includes a battery power charge limit. As yet a further option, the input device is an accelerator pedal (the motor vehicle may lack a brake pedal), and the vehicle control command received from the operator is a part of a braking procedure, e.g., resulting from a tip-out maneuver in a one-pedal driving operation.

The above summary does not represent every embodiment or every aspect of this disclosure. Rather, the above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes any and all combinations and subcombinations of the elements and features presented above and below.

Figure 1:
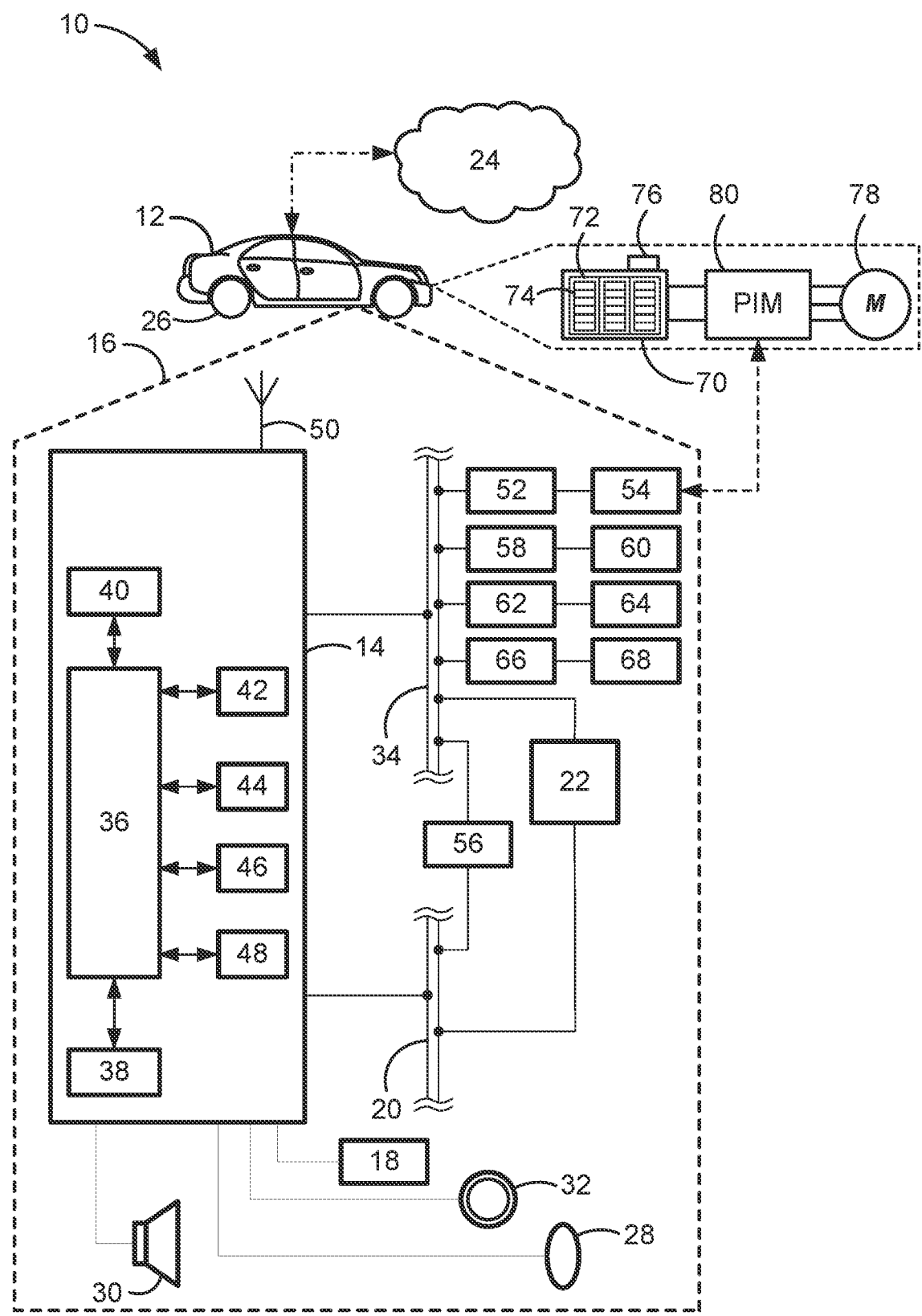
FIG. 1 is a schematic illustration of a representative electric-drive vehicle with a network of in-vehicle controllers, sensing devices, and communication devices for performing friction brake torque estimation for cooperative brake system operation during one-pedal driving according to aspects of the disclosed concepts.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed, for instance, by the appended claims.

DETAILED DESCRIPTION

This disclosure is susceptible of embodiment in many different forms. Representative examples of the disclosure are shown in the drawings and herein described in detail with the understanding that these embodiments are provided as an exemplification of the disclosed principles, not limitations of the broad aspects of the disclosure. To that end, elements and limitations that are described, for example, in the Abstract, Introduction, Summary, Description of the Drawings, and Detailed Description sections, but not explicitly set forth in the claims, should not be incorporated into the claims, singly or collectively, by implication, inference, or otherwise. Moreover, the drawings discussed herein may not be to scale and are provided purely for instructional purposes. Thus, the specific and relative dimensions shown in the Figures are not to be construed as limiting.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and permutations thereof, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle, when the vehicle is operatively oriented on a horizontal driving surface.

Referring now to the drawings, wherein like reference numbers refer to like features throughout the several views, there is shown in FIG. 1 a representative automobile, which is designated generally at 10 and portrayed herein for purposes of discussion as a sedan-style, electric-drive passenger vehicle. The illustrated automobile 10—also referred to herein as "motor vehicle" or "vehicle" for short—is merely an exemplary application with which novel aspects of this disclosure may be practiced. In the same vein, incorporation of the present concepts into an all-electric vehicle powertrain should also be appreciated as a non-limiting implementation of disclosed features. As such, it will be understood that aspects and features of this disclosure may be applied to other powertrain architectures, may be implemented for any logically relevant type of vehicle, and may be utilized for both OPD and non-OPD applications alike. Moreover, only select components of the motor vehicles and vehicle control systems are shown and described in additional detail herein. Nevertheless, the vehicles and vehicle systems discussed below may include numerous additional and alternative features, and other available peripheral components, for carrying out the various methods and functions of this disclosure.

The representative vehicle 10 of FIG. 1 is originally equipped with a vehicle telecommunication and information ("telematics") unit 14 that wirelessly communicates (e.g., via cell towers, base stations, mobile switching centers, satellite service, etc.) with a remotely located or "off-board" cloud computing host service 24. Some of the other vehicle hardware components 16 shown generally in FIG. 1 include, as non-limiting examples, an electronic video display device 18, a microphone 28, one or more audio speakers 30, and assorted input controls 32 (e.g., buttons, knobs, pedals, switches, touchpads, joysticks, touchscreens, etc.). These hardware components 16 function, in part, as a human/machine interface (HMI) to enable a user to communicate with the telematics unit 14 and other systems and system components within the vehicle 10. Microphone 28 provides a vehicle occupant with means to input verbal or other auditory commands; the vehicle 10 may be equipped with an embedded voice-processing unit utilizing audio filtering, editing, and analysis software modules. Conversely, speaker 30 provides audible output to a vehicle occupant and may be either a stand-alone speaker dedicated for use with the telematics unit 14 or may be part of an audio system 22. The audio system 22 is operatively connected to a network connection interface 34 and an audio bus 20 to receive analog information, rendering it as sound, via one or more speaker components.

Communicatively coupled to the telematics unit 14 is a network connection interface 34, suitable examples of which include twisted pair/fiber optic Ethernet switch, internal/external parallel/serial communication bus, a local area network (LAN) interface, a controller area network (CAN), a media-oriented system transfer (MOST), a local interconnection network (LIN) interface, and the like. Other appropriate communication interfaces may include those that conform with ISO, SAE, and IEEE standards and specifications. The network connection interface 34 enables the vehicle hardware 16 to send and receive signals with one another and with various systems and subsystems both within or "resident" to the vehicle body 12 and outside or "remote" from the vehicle body 12. This allows the vehicle 10 to perform various vehicle functions, such as modulating powertrain output, governing operation of the vehicle's transmission, selectively engaging the friction and regenerative brake systems, controlling vehicle steering, regulating charge and discharge of the vehicle's battery modules, and other automated driving functions. For instance, telematics unit 14 receives and transmits signals and data to/from a Powertrain Control Module (PCM) 52, an Advanced Driver Assistance System (ADAS) module 54, a Battery Pack Control Module (BPCM) 56, a traction power inverter module (TPIM) 58, a Brake System Control Module (BSCM) 60, and assorted other vehicle ECUs, such as a transmission control module (TCM), engine control module (ECM), Sensor System Interface Module (SSIM), climate control module (CCM), etc.

With continuing reference to FIG. 1, telematics unit 14 is an onboard computing device that provides a mixture of services, both individually and through its communication with other networked devices. This telematics unit 14 is generally composed of one or more processors 40, each of which may be embodied as a discrete microprocessor, an application specific integrated circuit (ASIC), or a dedicated control module. Vehicle 10 may offer centralized vehicle control via a central processing unit (CPU) 36 that is operatively coupled to one or more electronic memory devices 38, each of which may take on the form of a CD-ROM, magnetic disk, IC device, flash memory, semiconductor memory (e.g., various types of RAM or ROM), etc., and a real-time clock (RTC) 42.

Long-range vehicle communication capabilities with remote, off-board networked devices may be provided via one or more or all of a cellular chipset/component, a navigation and location chipset/component (e.g., global positioning system (GPS) transceiver), or a wireless modem, all of which are collectively represented at 44. Close-range wireless connectivity may be provided via a short-range wireless communication device 46 (e.g., a BLUETOOTH® unit or near field communications (NFC) transceiver), a dedicated short-range communications (DSRC) component 48, and/or a dual antenna 50. It should be understood that the vehicle 10 may be implemented without one or more of the above listed components or, optionally, may include additional components and functionality as desired for a particular end use. The various communication devices described above may be configured to exchange data as part of a periodic broadcast in a vehicle-to-vehicle (V2V) communication system or a vehicle-to-everything (V2X) communication system, e.g., Vehicle-to-Infrastructure (V2I), Vehicle-to-Pedestrian (V2P), Vehicle-to-Device (V2D), etc.

CPU 36 receives sensor data from one or more sensing devices that use, for example, photo detection, radar, laser, ultrasonic, optical, infrared, or other suitable technology for executing an automated driving operation, including short range communications technologies such as DSRC or Ultra-Wide Band (UWB). In accord with the illustrated example, the automobile 10 may be equipped with one or more digital cameras 62, one or more range sensors 64, one or more vehicle speed sensors 66, one or more vehicle dynamics sensors 68, and any requisite filtering, classification, fusion and analysis hardware and software for processing raw sensor data. The type, placement, number, and interoperability of the distributed array of in-vehicle sensors may be adapted, singly or collectively, to a given vehicle platform for achieving a desired level of autonomous vehicle operation.

To propel the electric-drive vehicle 10, an electrified powertrain is operable to generate and deliver tractive torque to one or more of the vehicle's road wheels 26. The powertrain is generally represented in FIG. 1 by a rechargeable energy storage system (RESS), which may be in the nature of a chassis-mounted traction battery pack 70 that is operatively connected to an electric traction motor 78. The traction battery pack 70 is generally composed of one or more battery modules 72 each having a stack of battery cells 74, such as lithium ion, lithium polymer, or nickel metal hydride battery cells of the pouch, can, or prismatic type. One or more electric machines, such as traction motor/generator (M) units 78, draw electrical power from and, optionally, deliver electrical power to the RESS's battery pack 70. A dedicated power inverter module (PIM) 80 electrically connects the battery pack 70 to the motor/generator (M) unit(s) 78 and modulates that transmission of electrical current therebetween.

The battery pack 70 is configured such that module management, cell sensing, and module-to-module or module-to-host communication functionality is integrated directly into each battery module 72 and performed wirelessly via a corresponding wireless-enabled cell monitoring unit (CMU) 76. The CMU 76 may be a microcontroller-based, printed circuit board (PCB)-mounted sensor array with GPS transceiver and RF capability and that is packaged on or in the battery module housing. The battery module cells 74, CMU 76, housing, coolant lines, busbars, etc., collectively define the cell module assembly. The disclosed configuration may forego use of separate hard-wired electronic modules and serial connectors of the type used in a cell sense board based topology.

During operation of the motor vehicle 10, driver and control module inputs may engender different vehicle speed commands with concomitant torque and acceleration or deceleration responses. Irrespective of whether the vehicle is an ICE, FEV, or REV-based powertrain, and irrespective of whether the vehicle is equipped with a single speed-control pedal or both brake and accelerator pedals, it may be desirable that the vehicle 10 be enabled to execute a vehicle speed command as part of a one-pedal driving (OPD) operation. As the name implies, an OPD operation allows a driver to start, accelerate, cruise, tip-in, tip-out, decelerate, and/or stop the vehicle using a single (accelerator) pedal.

During OPD, an operator-input vehicle speed command may be interpreted with an accompanying deceleration request, which is then correlated with a desired brake torque request value. This deceleration request may then be merged with a desired acceleration request, if any, to compute a final speed profile consistent with OPD driveability criteria. Actual applied friction brake torques at each road wheel may be returned to the VMC so that a closed-loop speed control may regulate activation of the friction brakes in addition to one or more powertrain system propulsion actuators to achieve desired speed tracking. Propulsion and friction brake axle torques may then be optimized to minimize any difference between predicted future vehicle speed trajectories and a desired speed profile.

Presented below are cooperative brake system control protocols that optimize friction brake torque calculations in order to coordinate powertrain actuators with friction brake actuators in a cooperative braking operation. Disclosed methods may employ an optimization status of the VMC to determine if brake torque calculations are limited by system constraints or by vehicle dynamics requirements. The controller architecture implements feedback and feed-forward inputs to synchronize one or more powertrain actuators (e.g., engine friction, motor braking, transmission braking, etc.) with one or more friction brake actuators (e.g., disc brake, drum brake, etc.) and, optionally, one or more other vehicle actuators (e.g., active aero devices) to achieve a desired final brake torque.

In order to coordinate actuator control, VMC and torque capacity calculations may be constrained by innate limitations on the capabilities of the powertrain's propulsion actuator(s). A separate friction brake generator may be used to compare a constrained VMC/torque capacity with a driver torque request to calculate a final friction brake torque request. Disclosed methods may also shape a driver's torque request in a manner that accounts for both propulsion and friction brake torque requests: a previous torque request may be used for shaping a current torque request while including both a propulsion brake torque request value and a friction brake torque request value. In a tip-in scenario, shaping may first remove a friction brake torque request before applying a propulsion torque to provide for a smooth ramp-out from friction brake and a smooth ramp-in to propulsion torque that meets transient acceleration response map-based torque shaping.

A friction brake torque request may be calculated to avoid filling for a VMC torque cut, e.g., to account for vehicle dynamics constraints. For instance, a friction brake torque request may be computed prior to VMC calculations based on a driver torque request and a system regen capacity that is constrained by any propulsion actuator capacity limits (e.g., battery power limits, motor/axle torque limits, etc.). A computed friction brake torque request may be provided to the VMC to modify the driver's torque request so that the VMC is responsible for achieving a remaining portion of the driver torque request using the propulsion actuator(s). Alternatively, a friction brake torque request may be calculated in order to fill for a VMC torque cut, e.g., to account for system constraints. For instance, a friction brake torque request may be computed based on one or more VMC torque requests that is/are constrained by actuator capacity limits and the driver's torque request. As yet a further option, a friction brake torque request may be calculated when the VMC is in speed control; the driver's torque request from the pedal may be augmented by a road load compensation using a speed profile merge factor to produce an effective torque request. A friction brake command may then be computed based on the effective driver torque request. Optionally, a friction brake request may be calculated as a function of a brake torque capability and an actual/commanded/estimated friction brake torque, e.g., using other actuators to fill-in for the deceleration demand in cases where the friction brake system's capability is saturated (e.g., active aero, transmission, engine braking).

Figure 2:
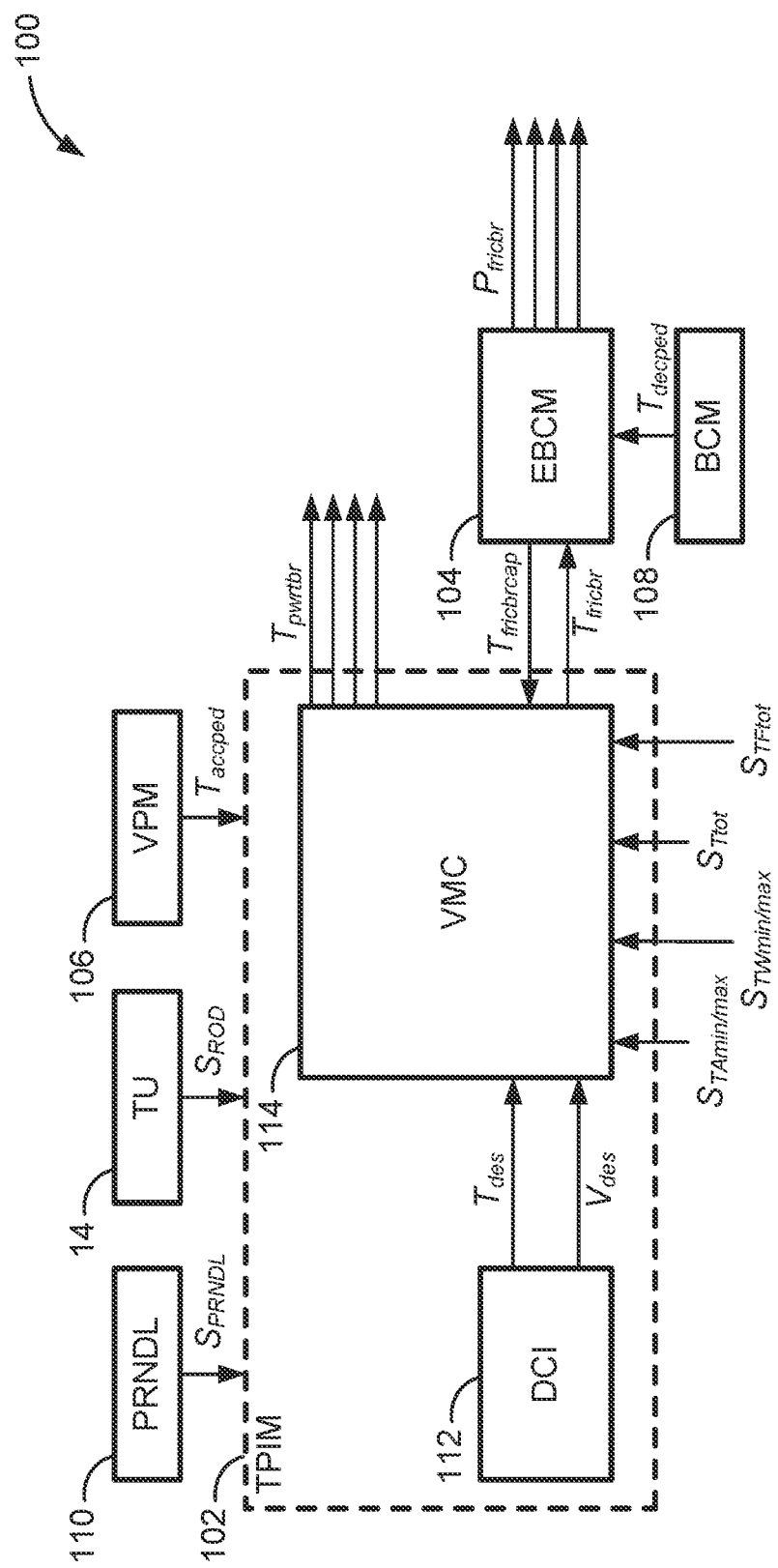
FIG. 2 is a schematic diagram illustrating a representative controller architecture for provisioning optimized friction brake torque estimation to operate a cooperative brake system in accord with aspects of the disclosed concepts.

FIG. 2 schematically illustrates a representative controller architecture 100 for provisioning optimized friction brake torque estimation to enhance operation of a cooperative brake system of a motor vehicle, such as automobile 10 of FIG. 1. In the illustrated example, a traction power inverter module 102 exchanges data with an electronic brake control module 104 to execute a cooperative braking operation. For instance, the TPIM 102 may receive an accelerator pedal torque request $T_{accped}$ from an accelerator pedal position (APP) sensor of an electronic accelerator pedal via a vehicle propulsion module (VPM) 106. Likewise, the EBCM 104 may receive a brake pedal torque request $T_{decped}$ from a brake pedal position (BPP) sensor of an electronic brake pedal via brake control module (BCM) 108. Brake pedal position and/or torque request data may also be fed directly from the BCM 108 to the TPIM 102. Additional vehicle control inputs received via the TPIM 102 may include an OPD level selection (e.g., input by a driver via telematics unit (TU) 14 or other suitable input device), a regen on demand (ROD) signal $S_{ROD}$ (e.g., output from TU 14 or from an ROD hardware unit), and/or a park-rear-neutral-drive-low (PRNDL) signal $S_{PRNDL}$ from a gear shift mechanism 110 (e.g., input controls 32).

From these various vehicle control inputs, the TPIM 102 may output a brake regen capacity signal, a brake regen achieved signal, and a propulsion friction brake request signal $T_{fricbr}$. One or more of these output signals may be received, filtered, and processed by the EBCM 104. EBCM 104, on the other hand, may output a brake regen request signal, a propulsion friction brake achieved signal, and a propulsion friction brake capacity signal $T_{fricbrcap}$. One or more of EBCM signal outputs may be received, filtered, and processed by the TPIM 102. In addition to cooperatively governing operation of the friction brake system brake device(s) and the traction motor(s), the TPIM 102 may output one or more control command signals to one or more other powertrain actuators, such as the internal combustion engine assembly or multi-speed power transmission, or to other vehicle actuators, such as an active aerodynamics ("active aero") device, to actively facilitate vehicle speed reduction.

Contained within the TPIM 102 unit is a driver command interpreter (DCI) 112 controller that aggregates, filters, and processes the above-enumerated vehicle control input signals received by the TPIM 102. From these signals, the DCI 112 outputs a desired torque request $T_{des}$ and a desired speed request $V_{des}$ to a vehicle motion controller (VMC) 114, which is also contained within the TPIM 102 unit. In addition to the desired torque and speed requests, the VMC 114 aggregates, filters, and processes brake system actuator constraints, including as non-limiting examples: axle torque min/max limit signals $S_{TAmin/max}$ for the vehicle's front and rear axles; wheel torque min/max limit signals $S_{TWmin/max}$ for the vehicle's individual road wheels 26; total torque min/max limit signals $S_{Ttot}$; and total friction brake torque $S_{TFtot}$ feedback signals. To control powertrain actuator-borne braking, such as regenerative braking torque, the VMC 114 outputs powertrain brake torque command signals $T_{pwrtbr}$ for the vehicle's road wheels 26. To control friction brake system actuator-borne braking, the VMC 114 outputs friction brake torque command signals $T_{fricbr}$ to the EBCM 104. The EBCM 104, in turn, outputs friction brake pressure signals $P_{FB}$ for the individual wheel units.

Figure 3:
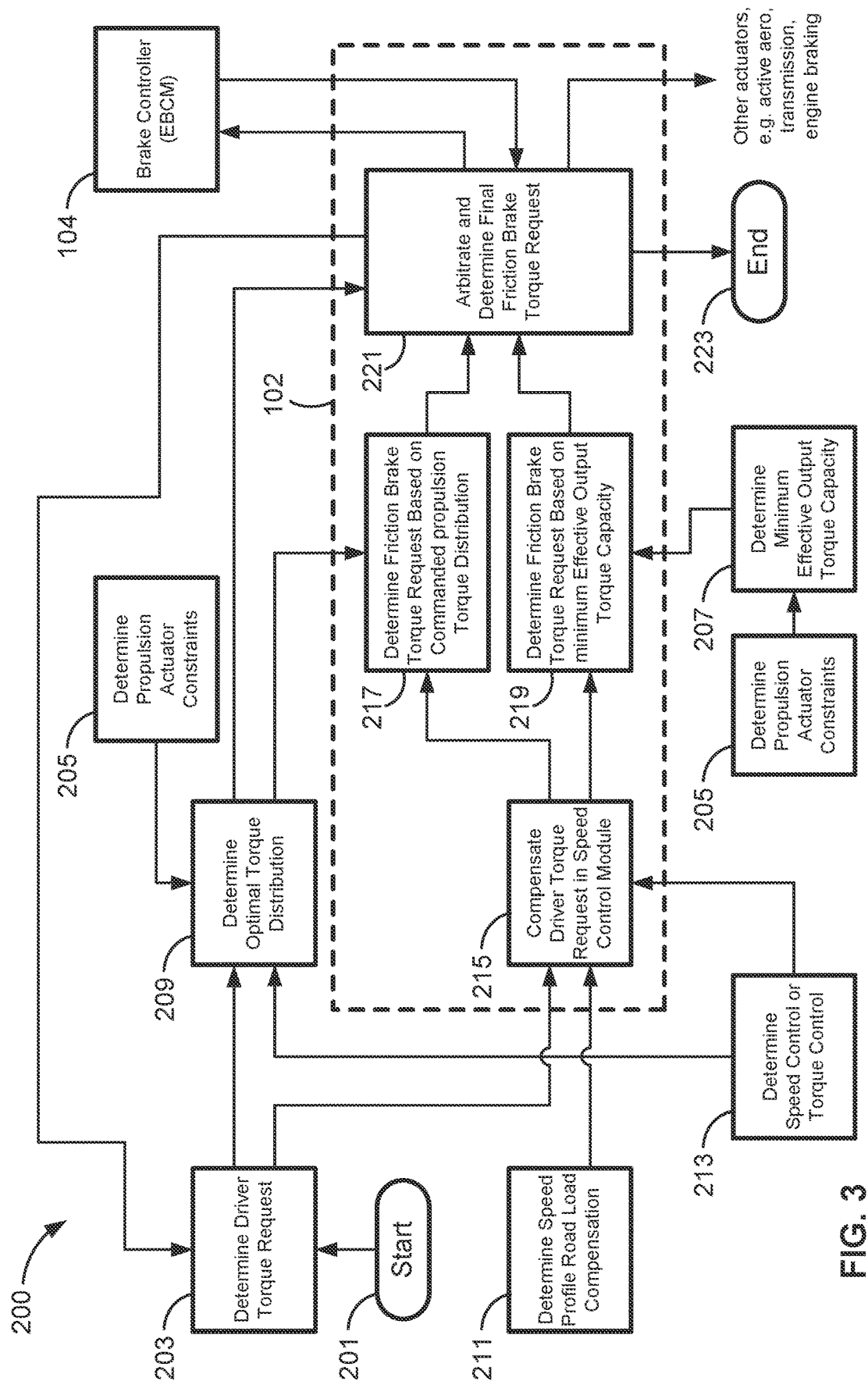
FIG. 3 is a flowchart illustrating a representative brake torque estimation control protocol for operating a cooperative brake system of a motor vehicle, which may correspond to memory-stored instructions that are executable by a resident or remote controller, control-logic circuit, programmable control unit, or other integrated circuit (IC) device or network of devices in accord with aspects of the disclosed concepts.

With reference next to the flow chart of FIG. 3, an improved method or control strategy for performing friction brake torque estimation for operating a cooperative brake system of a motor vehicle, such as vehicle 10 of FIG. 1, during execution of a desired vehicle maneuver, such as a one-pedal driving operation, is generally described at 200 in accordance with aspects of the present disclosure. Some or all of the operations illustrated in FIG. 3, and described in further detail below, may be representative of an algorithm that corresponds to processor-executable instructions that are stored, for example, in main or auxiliary or remote memory (e.g., memory device 38 of FIG. 1), and executed, for example, by an electronic controller, processing unit, logic circuit, or other module or device or network of modules/devices (e.g., CPU 36 of FIG. 1), to perform any or all of the above and below described functions associated with the disclosed concepts. It should be recognized that the order of execution of the illustrated operation blocks may be changed, additional operation blocks may be added, and some of the described operations may be modified, combined, or eliminated.

Method 200 of FIG. 3 begins at terminal block 201 with memory-stored, processor-executable instructions for a programmable controller or control module or similarly suitable processor to call up an initialization procedure for a vehicle brake system control protocol. This routine may be executed in real-time, continuously, systematically, sporadically and/or at regular intervals, for example, each 10 or 100 milliseconds during normal and ongoing operation of the motor vehicle 10. As yet another option, terminal block 201 may initialize responsive to a user command prompt, a resident vehicle controller prompt, or a broadcast prompt signal received from an "off-board" centralized host system (e.g., cloud computing service 24 of FIG. 1). Upon completion of the control operations presented in FIG. 3, the method 200 may advance to terminal block 223 and temporarily terminate or, optionally, may loop back to terminal block 201 and run in a continuous loop.

Advancing to process block 203, the method 200 receives an operator-requested speed increase or decrease via an in-vehicle driver input device. In accord with a non-limiting example, a driver releases (or depresses) an accelerator pedal to input a deceleration (or acceleration) command for the motor vehicle. This vehicle control command may be accompanied by a speed-change control command issued by a resident vehicle controller, such as ADAS module 54 of FIG. 1. As indicated above in the discussion of FIG. 2, the control system may also receive ROD and PRNDL operator selections that will affect the final determination for the driver torque request. For instance, a PRNDL signal $S_{PRNDL}$ may indicate that the vehicle powertrain has been set in a low gear (L1 or L2); doing so may result in selection of a different vehicle-calibrated pedal map or acceleration response map for purposes of interpreting a driver's pedal input. In a similar way, an ROD signal $S_{ROD}$ may indicate that the driver wishes to increase RESS charging through regenerative braking with a concomitant offset of a desired deceleration, e.g., by demanding more deceleration. As yet a further option, a driver may also change a desired acceleration response map by selecting a different level of OPD from the instrument panel. Initial torque request analysis may also account for an existing (prior-commanded) final friction brake torque request output by the VMC 114 to the EBCM 104 and returned as a closed-loop feedback control signal to the DCI 112.

Upon receipt of the foregoing operator-input vehicle control command(s), controller-executable instructions may cause the VMC 114 to identify, e.g., from vehicle-calibrated acceleration response data, a torque request that corresponds to the speed-change command input by the driver and any accompanying controller-generated speed-change commands. This acceleration table may include a memory-stored, controller-accessible acceleration response map file that maps a succession of vehicle speeds and vehicle acceleration/deceleration values with a corresponding succession of positive/negative torque outputs. Raw pedal travel data indicative of a desired acceleration/deceleration may be employed to "look up" a driver torque request in the map file as a function of a measured vehicle speed and a pedal position of the accelerator pedal received from a pedal sensor. As a further option, the above-described mapping may also be achieved by calling up a map file that correlates vehicle pedal position with vehicle acceleration/deceleration.

This "unshaped" operator torque request may be passed through a subroutine process block where it is "shaped" using a vehicle-calibrated transient acceleration table. The transient acceleration table may include a memory-stored, controller-accessible transient acceleration response map file. The transient map file may be a lookup table that defines vehicle brake torques in transient regions between adjacent vehicle brake torque output values in the acceleration map file. By way of non-limiting example, the transient map file may identify a respective ramp rate (e.g., change of acceleration or torque per loop) between each pair of neighboring points in the acceleration map file as a function of vehicle speed and torque change, i.e., the difference between a target torque and a current torque. The operator torque request may be shaped by incorporating these accel/torque ramp rate responses in order to add curvature to the torque request profile.

Method 200 continues to process block 205 (shown twice in FIG. 3) to identify a set of propulsion actuator constraints, if any, that may inhibit available powertrain propulsion actuators from achieving a desired brake torque. These constraints may include, individually or in any combination: battery power charge limits; motor torque output limits; engine friction torque limits; axle torque capacities for each vehicle axle (e.g., based on both motor and half-shaft torque capacities); wheel unit capacities for each road wheel; and calibratable torque buffers for VMC feedback compensation. For drivetrain architectures employing axles with independent left and right drive units, the smaller of the two torque capacities may be used for both of the drive units. These braking actuator constraints are thereafter used to determine a minimum effective output torque capacity, as indicated at process block 207. The minimum effective output torque capacity is the maximum brake torque capacity that can be achieved by the powertrain actuator(s) under the given constraints. By way of example, and not limitation, the minimum effective output torque capacity may be an indication of a total regenerative braking torque output that can be produced by the entire powertrain system at the time of a desired vehicle braking operation.

On top of assessing existing torque capacity constraints, method 200 also uses the propulsion actuator constraint(s) to derive an optimal torque distribution at process block 209. This optimal torque distribution may include a torque-optimization decision indication and an optimized propulsion torque distribution. For instance, the function may determine an optimal propulsion axle torque distribution (e.g., for vehicle axles 1, 2 . . . N) that will best meet an operator's longitudinal and lateral vehicle motion request (i.e., vehicle motion for acceleration, deceleration, yaw, etc., that is to be actuated by the propulsion system). For relevance to the closed-loop feedback control methodology of FIG. 3, there may be some cases where this function is unable to meet the operator's propulsion longitudinal deceleration request. Two representative cases are: (1) a powertrain system propulsion component is capability-limited (e.g., lack of motor regen torque capacity or battery charge capability); and (2) commanding a level of deceleration torque from the powertrain system may create lateral instability. In addition to the allocation of propulsion torque that will be commanded to the propulsion actuators, the optimal torque distribution control of block 209 may provide a torque optimization decision indication that case 1 or case 2 is occurring at a given reference time (e.g., during an OPD braking maneuver). Control of the cooperative brake system, namely the friction brake system actuators, may use this information to decide which calculated friction brake torque to use at process block 221, which will be discussed in further detail hereinbelow. Optimal torque distribution derivation may be carried out upstream of the VMC and TPIM, as shown, or within the VMC and TPIM, for other foreseeable controller architectures.

With continuing reference to FIG. 3, the method 200 executes memory-stored, controller-executable instructions at process block 211 to determine a road load compensation, if any, for a current speed profile of the vehicle. For instance, a road load correction may be calculated based on an estimated or measured road grade, a nominal or estimated vehicle mass, and an estimate of vehicle rolling friction, linear resistance, drag, etc., to "compensate" the torque request associated with the operator-requested speed increase/decrease. Using the principles of Newtonian mechanics, a deceleration profile may be computed with a force variable F as the mathematical sum of the driver-desired shaped torque, applied brake torque, road grade force, and road load force (ro+r1*v+r2*v^2, where v is the measured vehicle speed). In addition, a mass variable m is either a preset nominal vehicle mass or an estimated/measured (real-time) vehicle mass. Under some operating conditions, actual road grade is not considered; the road grade force input is therefor set to zero.

Advancing to process block 213, the method 200 identifies a current vehicle control mode for the vehicle powertrain system. To complete the determination in process block 213, a vehicle speed sensor may output one or more sensor signals indicative of a real-time speed of the subject vehicle. This real-time vehicle speed data is used, either independently or in combination with a driver-generated input, to select a vehicle control mode. According to an illustrative example, the control mode may be set as either a speed control mode or a torque control mode. For speed control mode, transient acceleration response map files may be interpreted as an acceleration request; brake pedal apply may be interpreted as a deceleration request and considered in the speed profile. For torque control mode, the acceleration response map and transient acceleration response map-based torque request is provided by the VMC 114. Mode selection may be based on real-time vehicle speed, a position of the driver input device (e.g., pedal position of accelerator/brake pedal), a rate-of-change of the position of the driver input device, and/or a measured road grade.

Once road-load compensation is determined at block 211 and vehicle control mode is determined at block 213, method 200 executes process block 215 to select either a compensated torque request or an uncompensated torque request for an ensuing set of friction brake torque request computations. Process block 215 may first determine if the vehicle control mode is in the speed control mode (or any one of a set of predefined vehicle "compensating" control modes). For instance, if the vehicle is not in speed control mode, the road-load correction is not applied to the driver torque request. On the other hand, a compensated torque request may be calculated via the VMC responsive to the vehicle control mode being set in speed control mode. A compensated torque request may be calculated as the mathematical sum of the torque request and the road load correction.

Using as inputs the compensated/uncompensated torque request, propulsion torque distribution, and minimum effective output torque capacity, process blocks 217 and 219 compute initial friction brake torque request estimates for the vehicle's friction brake system. At process block 217, for example, a first friction brake torque request may be calculated as the mathematical difference between: (1) the compensated/uncompensated torque request (depending on present vehicle control mode), and (2) the mathematical sum of the individual torque requests (propulsion axle torques) included in the propulsion brake torque distribution for the vehicle axles/road wheels. In the same vein, a second friction brake torque request may be calculated at process block 219 as the mathematical difference between: (1) the compensated/uncompensated torque request (depending on present vehicle control mode), and (2) the maximum brake torque capacity available from the powertrain actuator(s). Alternatively, a friction brake torque request may be a calibration function of a driver torque request and a minimum effective output torque capacity. These computations allow the closed-loop feedback control system to coordinate the friction brake actuators with the propulsion brake actuators while accounting for propulsion actuator limitations and dynamic distribution of propulsion actuator brake torque.

After completing the friction brake torque computations of process blocks 217 and 219, method 200 executes process block 221 to determine a final desired friction brake torque request by arbitrating between the initial friction brake torque request estimates based on a brake torque optimization decision derived from the operator's torque request and any propulsion actuator constraints. For at least some applications, the VMC 114 within TPIM 102 scrutinizes a torque-optimization decision indication included within the optimal torque distribution determination carried out at process block 209. A torque-optimization decision may suggest that the maximum brake torque capacity available from the powertrain actuator(s) is insufficient to achieve the operator's torque request (e.g., propulsion torque distribution cannot meet driver longitudinal decel request). The method 200 may responsively blend the friction brake torque requests towards the first friction brake torque request. In particular, the cooperative brake control system may outright select or place a larger emphasis on (i.e., utilize a larger percentage of) the friction brake torque request that is based on the commanded propulsion brake torque distribution.

Conversely, a torque-optimization decision may denote that available (e.g., measured or estimated) vehicle dynamics data intimates that the propulsion brake torque distribution is insufficient to achieve the operator's torque request (e.g., propulsion torque distribution causes lateral stability concerns). In this scenario, the method 200 may respond by blending the friction brake torque requests towards the second friction brake torque request. Put another way, the cooperative brake control system may outright select or place a larger emphasis on (i.e., utilize a larger percentage on) the friction brake torque request that is based on the minimum effective output torque capacity. In practical application, if a friction request is switched from being calculated upstream to downstream of the VMC 114, or vice versa, the control system is designed to avoid discontinuity in the friction brake request. A ramp function and/or a filter may be used to make sure that the request is continuous and smooth. Because there is potential for going from one friction brake torque to the other, a rate limit within the ramp function may be applied to ensure a smooth transition. Said another way, if propulsion system constraints are limiting vehicle deceleration, final friction brake request computations are carried out downstream of VMC 114 to maximize use of the propulsion system's capacity. However, if an operator torque request cannot be met due to vehicle stability constraints, final friction brake request computations are carried out upstream from the VMC to ensure that the VMC 114 can control potential torque vectoring. At this juncture, one or more brake torque command signals are transmitted to the friction brake system and/or to the powertrain actuator(s) to cooperatively output a total brake torque sufficient to meet the desired brake torque for meeting the operator's input command.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software, or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, solid-state memory, a hard drive, a CD-ROM, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms are described with reference to flowcharts depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method of operating a motor vehicle, the motor vehicle including a plurality of road wheels with a first wheel and a second wheel, first and second axles, a friction brake system, a powertrain system, and an input device operable to receive control inputs from an operator of the motor vehicle, the method comprising:
   receiving, via a vehicle controller from the operator via the input device, a vehicle control command with an associated torque request for the motor vehicle;
   determining, via the vehicle controller, a propulsion actuator constraint limiting a brake torque capacity available from a powertrain actuator of the powertrain system;
   determining, via the vehicle controller using the propulsion actuator constraint and the torque request input by the operator, a propulsion brake torque distribution for the road wheels of the motor vehicle and a maximum brake torque capacity for the powertrain actuator, the propulsion brake torque distribution including a first propulsion torque of the powertrain actuator allocated to the first axle or the first wheel of the motor vehicle and a second propulsion torque of the powertrain actuator allocated to the second axle or the second wheel of the motor vehicle;
   determining a first friction brake torque request using the propulsion brake torque distribution, the torque request, and a vehicle control mode of the powertrain system;
   determining a second friction brake torque request using the maximum brake torque capacity, the torque request, and the vehicle control mode;
   determining a final friction brake torque command by arbitrating between the first and second friction brake torque requests based on a brake torque optimization decision; and
   transmitting, via the vehicle controller, the final friction brake torque command to the friction brake system to apply a friction-based brake torque and a final powertrain brake command to the powertrain actuator to apply a powertrain actuator-based brake torque.

2. The method of claim 1, further comprising:
   determining a road load correction based on a road load force applied by a driving surface to the motor vehicle and a speed profile of the motor vehicle; and calculating, via the vehicle controller responsive to the vehicle control mode of the powertrain system being a speed control mode, a compensated torque request as a sum of the torque request and the road load correction.

3. The method of claim 2, wherein determining the first and second friction brake torque request includes:
using the compensated torque request as the torque request responsive to the vehicle control mode being in the speed control mode; and
using the torque request uncompensated by the road load correction responsive to the vehicle control mode not being in the speed control mode.

4. The method of claim 3, wherein determining the first friction brake torque request includes calculating a mathematical difference between: (1) the compensated torque request or the uncompensated torque request, and (2) a sum of individual actuator torque requests included in the propulsion brake torque distribution for the road wheels of the motor vehicle.

5. The method of claim 3, wherein determining the second friction brake torque request includes calculating a mathematical difference between: (1) the compensated torque request or the uncompensated torque request, and (2) the maximum brake torque capacity of the powertrain actuator determined from the propulsion actuator constraint.

6. The method of claim 1, wherein arbitrating between the first and second friction brake torque requests includes:
blending the first and second friction brake torque requests with a larger percentage of the first friction brake torque request in response to the brake torque optimization decision indicating that the maximum brake torque capacity for the powertrain actuator is insufficient to achieve the torque request; and
blending the first and second friction brake torque requests with a larger percentage blending the first and second friction brake torque requests with a larger percentage of the second friction brake torque request in response to the brake torque optimization decision indicating that sensed or estimated vehicle dynamics data suggests that the propulsion brake torque distribution is insufficient to achieve the torque request.

7. The method of claim 1, further comprising:
receiving, via the vehicle controller from a speed sensor, a sensor signal indicative of a real-time vehicle speed of the motor vehicle; and
selecting the vehicle control mode as a speed control mode or a torque control mode using the real-time vehicle speed.

8. The method of claim 1, further comprising:
receiving a regenerative braking on demand (ROD) input signal and/or a park-reverse-neutral-drive-low (PRNDL) input signal; and
determining the torque request associated with the vehicle control command input by the operator based on the ROD input signal and/or the PRNDL input signal.

9. The method of claim 1, wherein determining the torque request is further based on a prior-commanded final friction brake torque command transmitted to the friction brake system.

10. The method of claim 1, further comprising:
determining, via the vehicle controller from memory-stored acceleration response data, a negative torque command for the torque request associated with the vehicle control command input by the operator; and
shaping the negative torque command based on memory-stored transient acceleration response data.

11. The method of claim 1, wherein the vehicle controller includes a vehicle motion controller (VMC) and a driver command interpreter (DCI) module contained within a traction power inverter control module (TPIM), and the friction brake system includes an electronic brake control module (EBCM), and wherein the VMC transmits the final friction brake torque command to the EBCM.

12. The method of claim 1, wherein the motor vehicle includes a battery pack, the powertrain actuator includes an electric traction motor, and the propulsion actuator constraint includes a battery power charge limit of the battery pack and/or a motor torque limit of the electric traction motor.

13. The method of claim 1, wherein the input device is an accelerator pedal, wherein the motor vehicle lacks a brake pedal, and wherein the vehicle control command is a part of a braking maneuver in a one-pedal driving (OPD) operation.

14. An electric-drive vehicle comprising:
a vehicle body;
first and second axles attached to the vehicle body and bearing multiple road wheels, the multiple road wheels including a first wheel and a second wheel;
a powertrain system with a traction motor attached to the vehicle body and operable to drive one or more of the road wheels to thereby propel the electric-drive vehicle;
a friction brake system attached to the vehicle body and operable to decelerate one or more of the road wheels to thereby slow or stop the electric-drive vehicle;
an input device operable to receive control inputs from an operator of the electric-drive vehicle; and
a vehicle controller programmed to:
receive, from the operator via the input device, a vehicle control command having associated therewith a torque request for the motor vehicle;
determine a propulsion actuator constraint limiting a brake torque capacity available from a powertrain actuator of the powertrain system;
determine, using the propulsion actuator constraint and the torque request, a propulsion brake torque distribution for the road wheels of the motor vehicle and a maximum brake torque capacity for the powertrain actuator, the propulsion brake torque distribution including a first propulsion torque of the powertrain actuator allocated to the first axle or the first wheel and a second propulsion torque of the powertrain actuator allocated to the second axle or the second wheel;
determine a first friction brake torque request using the propulsion brake torque distribution, the torque request, and a vehicle control mode of the powertrain system;
determine a second first friction brake torque request, distinct from the first friction brake torque request, using the maximum brake torque capacity, the torque request, and the vehicle control mode;
determine a final friction brake torque command by arbitrating between the first and second friction brake torque requests based on a brake torque optimization decision; and
transmit the final friction brake torque command to the friction brake system and a final powertrain brake command to the powertrain actuator.

15. The electric-drive vehicle of claim 14, wherein the vehicle controller is further programmed to:
determine a road load correction based on a road load force applied by a driving surface to the motor vehicle and a speed profile of the motor vehicle; and responsive to the vehicle control mode of the powertrain system being a speed control mode, calculate a compensated torque request as a sum of the torque request and the road load correction.

16. The electric-drive vehicle of claim 14, wherein determining the first and second friction brake torque request includes:
using the compensated torque request as the torque request responsive to the vehicle control mode being in the speed control mode; and
using the torque request uncompensated by the road load correction responsive to the vehicle control mode not being in the speed control mode.

17. The electric-drive vehicle of claim 16, wherein determining the first friction brake torque request includes calculating a mathematical difference between: (1) the compensated torque request or the uncompensated torque request, and (2) a sum of individual torque requests included in the propulsion brake torque distribution for the road wheels of the motor vehicle.

18. The electric-drive vehicle of claim 16, wherein determining the second friction brake torque request includes calculating a mathematical difference between: (1) the compensated torque request or the uncompensated torque request, and (2) the maximum brake torque capacity of the powertrain actuator determined from the propulsion actuator constraint.

19. The electric-drive vehicle of claim 14, wherein arbitrating between the first and second friction brake torque requests includes:
blending the first and second friction brake torque requests with a larger percentage of the first friction brake torque request in response to the brake torque optimization decision indicating that the maximum brake torque capacity for the powertrain actuator is insufficient to achieve the torque request; and
blending the first and second friction brake torque requests with a larger percentage blending the first and second friction brake torque requests with a larger percentage of the second friction brake torque request in response to the brake torque optimization decision indicating that received vehicle dynamics data indicates that the propulsion brake torque distribution is insufficient to achieve the torque request.

20. The electric-drive vehicle of claim 14, wherein the vehicle controller is further programmed to:
determine, from memory-stored acceleration response data, a negative torque command for the torque request associated with the vehicle control command input by the operator; and
shape the negative torque command based on memory-stored transient acceleration response data.

* * * * *